(12) United States Patent
Yatsu et al.

(10) Patent No.: US 7,324,667 B2
(45) Date of Patent: Jan. 29, 2008

(54) DATA CONVERTER

(75) Inventors: Nobuo Yatsu, Shinagawa (JP); Norio Endo, Shinagawa (JP)

(73) Assignee: Fujitsu Takamisawa Component Ltd., Tokyo (JP)

( * ) Notice: Subject to any disclaimer, the term of this patent is extended or adjusted under 35 U.S.C. 154(b) by 663 days.

(21) Appl. No.: 09/771,691

(22) Filed: Jan. 30, 2001

(65) Prior Publication Data

US 2001/0019302 A1    Sep. 6, 2001

(30) Foreign Application Priority Data

Mar. 2, 2000    (JP) .............................. 2000-057711

(51) Int. Cl.
*G06K 9/00*    (2006.01)
*G05B 19/00*    (2006.01)

(52) U.S. Cl. ..................................... 382/115; 340/5.53

(58) Field of Classification Search ................ 382/115, 382/116, 124–127; 235/380, 382.5, 382; 340/5.53, 5.83; 902/3–6; 356/71; 327/298; 345/163; 713/202, 182, 186
See application file for complete search history.

(56) References Cited

U.S. PATENT DOCUMENTS

| | | | | |
|---|---|---|---|---|
| 4,262,329 A | * | 4/1981 | Bright et al. ............... | 713/164 |
| 5,325,442 A | * | 6/1994 | Knapp ......................... | 382/124 |
| 5,559,504 A | * | 9/1996 | Itsumi et al. ................ | 340/5.53 |
| 5,828,773 A | * | 10/1998 | Setlak et al. ................ | 382/126 |
| 5,838,306 A | * | 11/1998 | O'Conner et al. ........... | 345/163 |
| 5,872,834 A | * | 2/1999 | Teitelbaum ................ | 379/93.03 |
| 6,141,436 A | * | 10/2000 | Srey et al. .................. | 382/124 |
| 6,148,094 A | * | 11/2000 | Kinsella ...................... | 382/124 |
| 6,219,793 B1 | * | 4/2001 | Li et al. ...................... | 713/202 |
| 6,292,045 B1 | * | 9/2001 | Bongiorno et al. .......... | 327/298 |
| 6,369,798 B1 | * | 4/2002 | Yatsu et al. ................. | 345/167 |
| 6,985,582 B1 | * | 1/2006 | Sano et al. .................... | 380/42 |
| 2002/0114466 A1 | * | 8/2002 | Tanaka et al. ............... | 380/232 |
| 2003/0074319 A1 | * | 4/2003 | Jaquette ....................... | 705/51 |

FOREIGN PATENT DOCUMENTS

WO    WO 02/43342 A2  *  5/2002

* cited by examiner

*Primary Examiner*—Vikkram Bali
(74) *Attorney, Agent, or Firm*—Staas & Halsey LLP

(57) ABSTRACT

A data converter is provided, which data converter includes a data conversion unit, a timer unit which counts time, and a lock system which locks a data conversion function of the data conversion unit in a disabled state based on the time counted by the timer unit.

16 Claims, 7 Drawing Sheets

DATA CONVERTER

BACKGROUND OF THE INVENTION

1. Field of the Invention

The present invention generally relates to data converters each of which includes a data leakage prevention function and is applied to a portable terminal unit such as a small size computer, and more particularly to a data converter such as a cryptographic card or an IC card which data converter includes a timer unit so that data is prevented from being read out without a predetermined release operation after the passage of a predetermined time.

2. Description of the Related Art

Information/communication apparatus such as a portable telephone and a computer network have been remarkably widely used of late. It is expected that more portable computers (portable terminal units) will be used in the future to access an in-house information network from outside to download data. In such a situation, it is probable that a user may inadvertently lose a user's portable terminal unit or have the user's portable terminal unit stolen and fall into the hands of someone else. Therefore, it is essential to take measures so that important data stored in a portable terminal unit is prevented from being read by others in such a case as described above.

Thus, conventionally, a variety of encryption software or hardware has been examined and proposed to encrypt data stored in a portable terminal unit so as to provide security for the data.

A cryptographic card, for example, is proposed as encryption hardware to provide security for data stored in a portable terminal unit. According to a technology employing the cryptographic card, a portable terminal unit is enabled only when a predetermined cryptographic card is set therein. Therefore, as long as the predetermined cryptographic card is under the charge of a registered user, data stored in the portable terminal unit is prevented from being read by another person who does not have the predetermined cryptographic card. Further, as a general rule, a cryptographic card of this type additionally includes a function to collate a predetermined password, a signature of the user or a fingerprint of the user input to the cryptographic card with stored data. Thereby, a user authentication is performed to determine whether a cryptographic card holder is the registered user, thus increasing data security.

However, the user's portable terminal unit may be lost or stolen in an enabled state with the cryptographic card set therein. In such a case, the portable terminal unit is properly enabled, so that the important data stored therein may be read by others. That is, sufficient security is not provided for the data.

SUMMARY OF THE INVENTION

It is a general object of the present invention to provide a data converter in which the above-described disadvantage is eliminated.

A more specific object of the present invention is to provide a data converter for a computer which data converter can reliably prevent data leakage.

The above objects of the present invention are achieved by a data converter including a data conversion unit, a timer unit which counts time, and a lock system which locks a data conversion function of the data conversion unit in a disabled state based on the time counted by the timer unit.

According to the above-described data converter, the data conversion function is locked in a disabled state after the passage of a predetermined period of time. Therefore, even if a computer to which the data converter is connected falls into the hands of other people, important data stored in the computer is prevented from being read out.

The above objects of the present invention are also achieved by a computer with a data leakage prevention function which computer includes a data converter including a data conversion unit, a timer unit which counts time, and a lock system which locks a data conversion function of the data conversion unit in a disabled state based on the time counted by the timer unit.

According to the above-described computer, the data conversion function is locked in a disabled state after the passage of a predetermined period of time. Therefore, even if the computer falls into the hands of other people, important data stored in the computer is prevented from being read out.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of embodiments of the present invention. In each embodiment, a data converter according to the present invention is shown as a cryptographic card.

Figure 1:
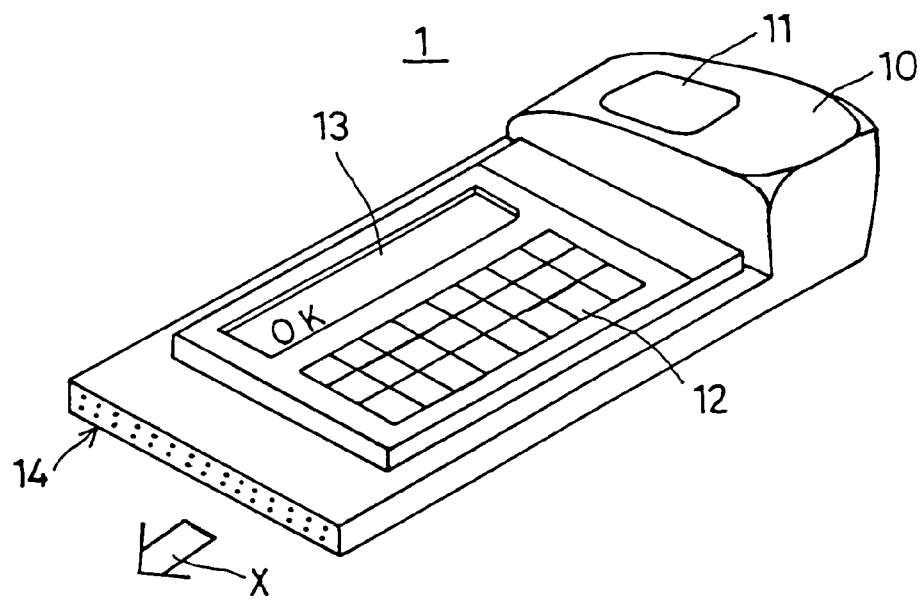
FIG. 1 is a perspective view of a cryptographic card according to a first embodiment of the present invention.

FIG. 1 is a perspective view of a cryptographic card 1 according to a first embodiment of the present invention. The cryptographic card 1 employs a fingerprint as identification data for releasing a lock on the cryptographic card 1.

According to FIG. 1, the cryptographic card 1 includes a fingerprint input unit 10, a display 13 for indicating whether the cryptographic card 1 is in a locked state, and entry keys 12 for setting and changing a waiting time before the cryptographic card 1 enters a locked state. The fingerprint input unit 10 includes an input screen 11, to which a finger of a user is applied to register a fingerprint of the finger and to input the fingerprint to release the lock. The fingerprint input unit 10 further includes, below the input screen 11, a fingerprint detection unit for recognizing the fingerprint and a data generation unit which generates fingerprint data as identification data based on the detected fingerprint. As a method of detecting the fingerprint, a known image recognition technology can be employed. For example, the fingerprint input unit 10 can employ a method which measures static electricity of each of fine pixels into which the input screen 11 is divided, or a method which projects a light on the input screen 11 so that the fingerprint is read by an optical method.

Figure 2:
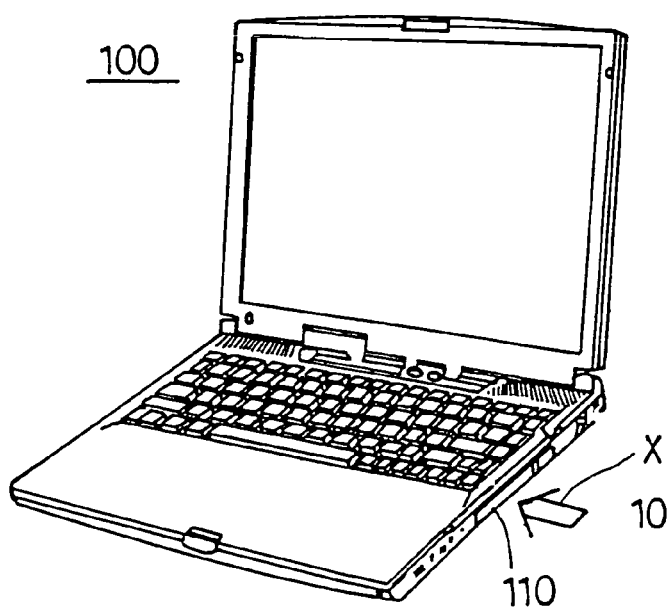
FIG. 2 is a perspective view of a computer to which the cryptographic card of FIG. 1 is connected.

The cryptographic card 1 further includes a connector portion 14 formed on one end thereof, which connector portion includes a plurality of contact holes. For example, the connector portion 14 of the cryptographic card 1 is inserted into a slot portion 110 of a computer 100 shown in FIG. 2 in a direction indicated by an arrow X in each of FIGS. 1 and 2 so that the cryptographic card 1 can be connected to the computer 100.

Figure 3:
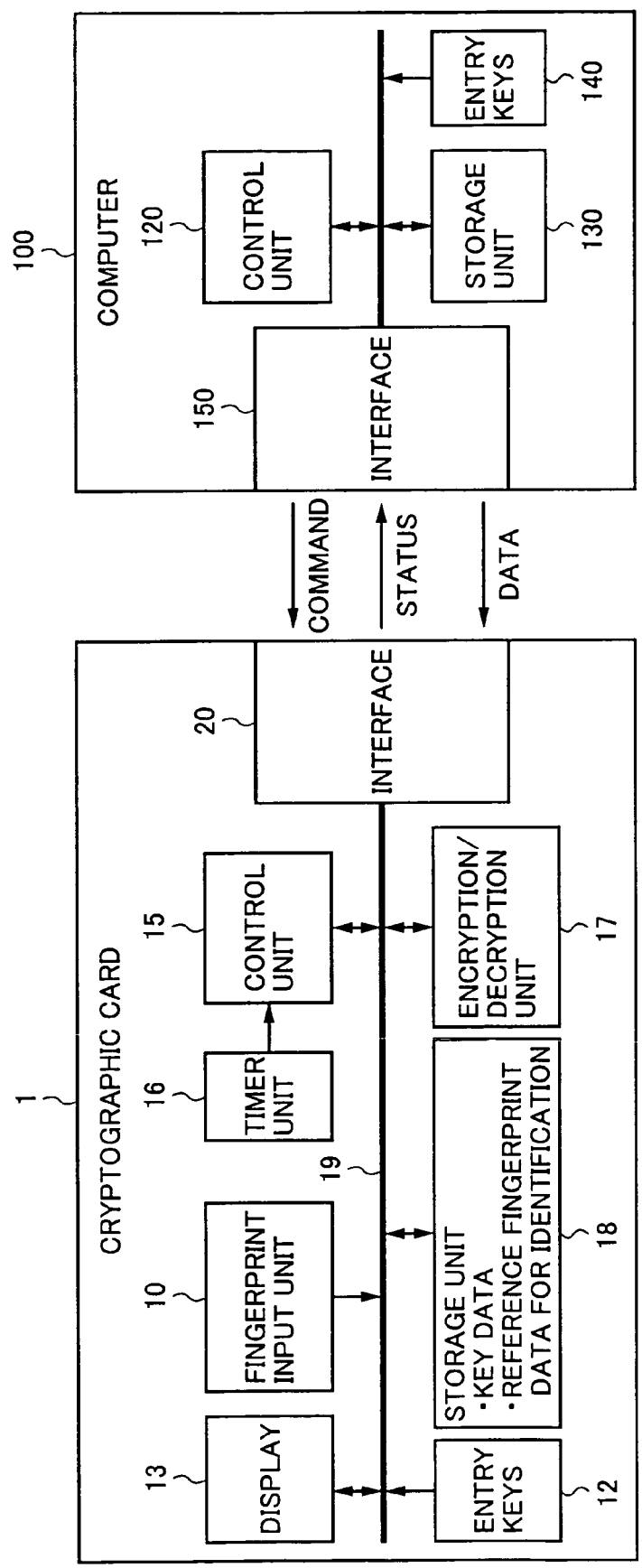
FIG. 3 is a block diagram showing a structure of the cryptographic card of FIG. 1 and a partial structure of the computer of FIG. 2.

FIG. 3 is a block diagram showing a structure of the cryptographic card 1 and a partial structure of the computer 100, to which the cryptographic card 1 is connected. The cryptographic card 1 includes a control unit 15, a timer unit 16, an encryption/decryption unit 17, and a storage unit 18 in addition to the above-described fingerprint input unit 10, entry keys 12, and display 13, which are connected to one another via a bus 19 so that the control unit 15 including a CPU (central processing unit) can control the whole cryptographic card 1 including a lock release operation.

The cryptographic card 1 further includes an interface 20 for connection to the computer 100. The partial structure of the computer 100 includes a control unit 120, a storage unit 130 for storing data files, entry keys 140, and an interface 150 for connection to the cryptographic card 1 in addition to the above-described slot portion 110. Via the interface 20 on the side of the cryptographic card 1 and the interface 150 on the side of the computer 100, a command signal is transmitted from the computer 100 to the cryptographic card 1, a status signal is transmitted from the cryptographic card 1 to the computer 100, and data is exchanged between the computer 100 and the cryptographic card 1. The interfaces 20 and 150 are structured based on a standard such as PCMCIA (Personal Computer Memory Card International Association), which is a standard for an IC card.

The cryptographic card 1 is originally equipped with a data conversion function to encrypt data generated in the computer 100 to prevent data leakage. That is, when the cryptographic card 1 is connected to the computer 100, the data generated in the computer 100 is encrypted in the cryptographic card 1 and is returned to the computer 100 to be stored in the storage unit 130. On the other hand, in the case of reading out the encrypted data, the encrypted data is transmitted from the computer 100 to the cryptographic card 1 for decryption before the data becomes available. The encryption and decryption of the data in the cryptographic card 1 is performed by the encryption/decryption unit 17 under the control of the control unit 15. Therefore, the data cannot be read out without connecting the cryptographic card 1 to the computer 100, and as far as the cryptographic card 1 is under the strict charge of the user, the data leakage is prevented even though the computer 100 falls into the hands of a third party. An encryption method applicable to this embodiment is a standard method employed in a computer industry such as DES (data encryption standard), Triple-DES, or FEAL (fast data encipherment algorithm), or a method commonly used on the Internet such as RSA (Rivest-Shamir-Adleman scheme) or elliptic curve cryptosystem.

However, it is possible that the computer 100 is lost or stolen with the cryptographic card 1 being connected thereto. Therefore, the cryptographic card 1 further includes a lock system.

The lock system sets the encryption/decryption unit 17 in a locked state so that the encryption/decryption unit 17 is disabled after the passage of a predetermined waiting time set by the timer unit 16. Therefore, even if the computer 100 falls into the hands of a third party with the cryptographic card 1 being connected thereto, such a lock system prevents the data from being read out after the cryptographic card 1 enters a locked state after the passage of the waiting time. Thereby, the data leakage is prevented.

As the above-described waiting time, for example, a predetermined elapsed time since the connection of the cryptographic card 1 to the computer 100, or a predetermined elapsed time since the start of an actual processing by the computer 100 may be employed. It is also possible to add a unit which allows the user to input a desired time to set the above-described waiting time. As shown in FIG. 3, the cryptographic card 1 includes the entry keys 12 for time setting along with the timer unit 16 so as to change the waiting time as desired. The control unit 15 reads and compares the waiting time determined by the user through the entry keys 12 and time information from the timer unit 16. When the control unit 15 determines that a counted time exceeds the set waiting time, the control unit 15 locks the cryptographic card 1 in a disabled state.

With the entry keys 12, which allows the user to change time setting, being provided as in the cryptographic card 1 according to this embodiment, the user can change the waiting time in accordance with the user's operation environment of the computer 100, that is, in accordance with the degree of the risk of the data leakage. The cryptographic card 1 is not necessarily required to be in a locked state under a highly safe environment, and can be made more user-friendly by including a time setting unit such as the above-described entry keys 12 since a later-described lock release operation is required after the cryptographic card 1 enters a locked state. The display 13 of the cryptographic card 1 displays, for example, "LOCK" when the cryptographic card 1 is in a locked state after the passage of the waiting time, and "OK" when the cryptographic card 1 is in an enabled state. Thereby, it can be checked whether the data stored in the computer 100 is in a readable state.

The cryptographic card 1 includes a lock release system so that the user can release the lock on the cryptographic card 1 after the cryptographic card 1 enters a locked state. The user in advance stores a user's fingerprint in the storage unit 18 as reference data for identification. In order to release the lock on the cryptographic card 1, the user inputs the fingerprint data again in the input screen 11 so that the input data is collated with the stored data. In other words, in the initial use of the computer 100, the user inputs the fingerprint in the input screen 11 of the fingerprint input unit 10 so that the input fingerprint is stored in the storage unit 18 as the reference data for identification. To release the lock on the cryptographic card 1, the user applies the finger whose fingerprint is registered on the input screen 11 to input the fingerprint so that the control unit 15 collates the input fingerprint data with the reference data for identification read out from the storage unit 18. After the control unit 15 confirms that the input data is identical to the reference data, the lock on the cryptographic card 1 is released.

The storage unit 18 of the cryptographic card 1 also functions as a reference data for identification recording unit, and stores key data used by the encryption/decryption unit 17 for the data encryption/decryption. When the control unit 15 sets the cryptographic card 1 in a locked state, the key data is prevented from being read out, thus preventing the encryption/decryption from being performed.

Figure 4:
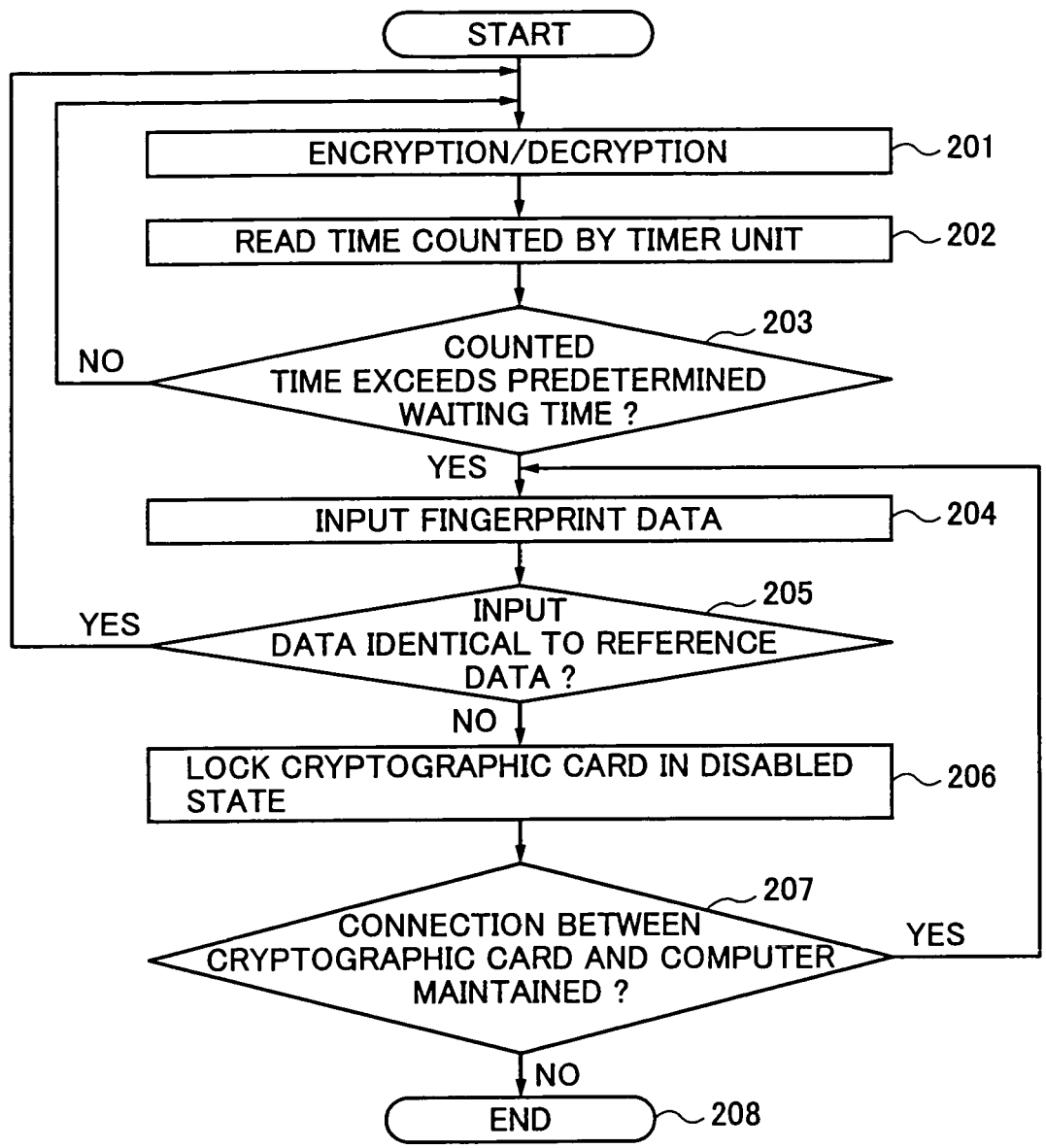
FIG. 4 is a flowchart of a process of a basic routine performed by a control unit of the cryptographic card of FIG. 1.

FIG. 4 is a flowchart of a process of a basic routine performed by the control unit 15 of the cryptographic card 1. The routine of FIG. 4 is performed by properly connecting the cryptographic card 1 to the computer 100.

In step S201, the data stored in the storage unit 130 of the computer 100 is decrypted in the cryptographic card 1 before being read out, or the data generated in the computer 100 is encrypted in the cryptographic card 1 before being stored again in the storage unit 130 of the computer 100. In step S202, the control unit 15 reads time counted by the timer unit 16, and then the process goes to step S203.

In step S203, the control unit 15 determines whether the time counted by the timer unit 16 exceeds the predetermined waiting time. If the counted time does not exceed the predetermined waiting time, the process returns to step S201 to repeat the above-described steps. On the other hand, if the counted time exceeds the predetermined waiting time, in step S104, the fingerprint data is input. Then, in step S205, the control unit 15 collates the input fingerprint data with the reference data for identification to determine whether the input data is identical to the reference data. If the control unit 15 determines that the input data is identical to the reference data, the cryptographic card 1 is kept in an enabled state and the process returns to step S201.

On the other hand, if the fingerprint data is not input in step S204, or the control unit 15 determines in step S205 that the input data is not identical to the reference data, the process goes to step S206, in which the cryptographic card 1 is disabled in a locked state. In this case, the display 13 displays "LOCK" as previously described.

In step S207, it is determined whether the connection between the cryptographic card 1 and the computer 100 is maintained. If it is determined that the connection is maintained, the process returns to step S204 to repeat the steps thereafter. A state where steps S204 through S207 are repeated corresponds to the above-described locked state of the cryptographic card 1. If it is determined that the connection between the cryptographic card 1 and the computer 100 is interrupted, the process goes to step S208 and the control unit 15 terminates the above-described routine.

According to this embodiment, the fingerprint of the user, which is less likely to be stolen by others, is employed as the identification data, thus allowing strict collation between the entered and reference data. Therefore, even if the computer 100 falls into the hands of a third party with the cryptographic card 1 being connected thereto, the stored data cannot be read out after the cryptographic card 1 enters a locked state after the passage of the predetermined waiting time, thus reliably preventing the data leakage.

Figure 5:
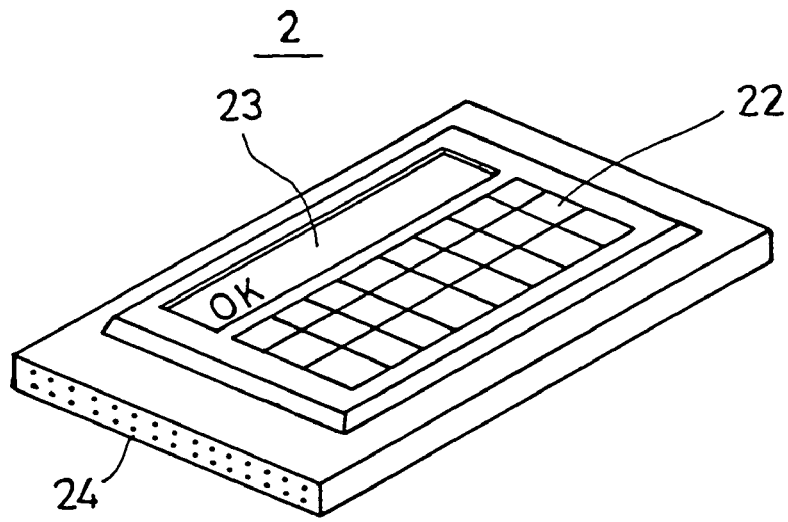
FIG. 5 is a perspective view of a cryptographic card according to a second embodiment of the present invention.

FIG. 5 is a perspective view of a cryptographic card 2 according to a second embodiment of the present invention. The cryptographic card 2 employs a password entered from entry keys 22 as identification data used for releasing a lock on the cryptographic card 2. Since the cryptographic card 2 has the same basic structure as the cryptographic card 1, a description of the structure of the cryptographic card 2 will be given only on the elements thereof different from those of the cryptographic card 1.

The cryptographic card 2 includes the entry keys 22, a display 23, and a connector portion 24. According to the cryptographic card 2, in the initial use of a computer to which the cryptographic card 2 is connected, a password is entered from the entry keys 22 to be stored in a storage unit of the cryptographic card 2, and is employed as reference data for identification. The lock on the cryptographic card 2 is released by entering the same password.

The second embodiment differs from the first embodiment in employing the password instead of the fingerprint as the identification data. According to this embodiment, the cryptographic card 2 with a data leakage prevention function, which cryptographic card is allowed to have a simple structure by using the entry keys 22 for setting and changing a waiting time also for entering the password, can be provided.

Figure 6:
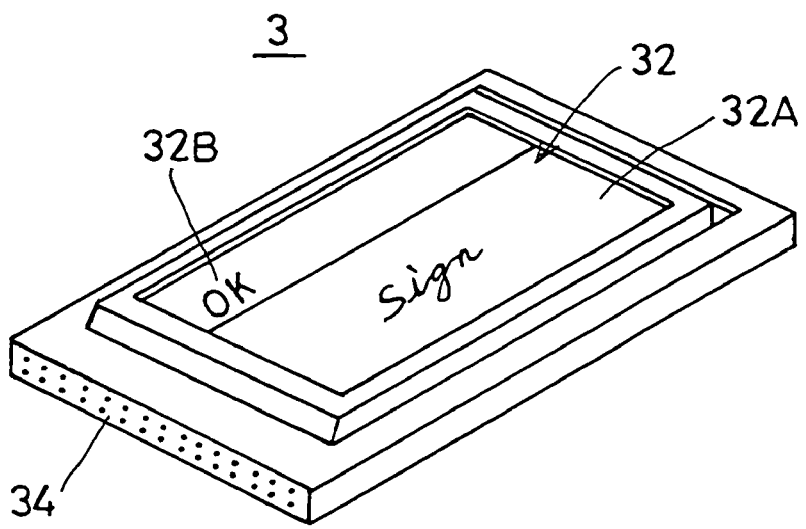
FIG. 6 is a perspective view of a cryptographic card according to a third embodiment of the present invention.

FIG. 6 is a perspective view of a cryptographic card 3 according to a third embodiment of the present invention. The cryptographic card 3 employs a signature of a user input from an input/display unit 32 as identification data used for releasing a lock on the cryptographic card 3. Since the cryptographic card 3 has the same basic structure as the cryptographic card 1, a description of the structure of the cryptographic card 3 will be given only on the elements thereof different from those of the cryptographic card 1.

The cryptographic card 3 includes the input/display unit 32 and a connector portion 34. The input/display unit 32 includes a transparent plane coordinate input panel 32A, which is touched to allow input of data using the coordinates of touched positions, and a display 32B, which is provided on the bottom side of the input/display unit 32 and displays numbers and letters.

According to the cryptographic card 3, in the initial setting of a computer to which the cryptographic card 3 is connected, a user's signature is input to the plane coordinate input panel 32A to be stored in a storage unit of the cryptographic card 3, and is employed as reference data for identification. The lock on the cryptographic card 3 is released by inputting the same signature.

The third embodiment differs from the first embodiment in employing the signature instead of the fingerprint as the identification data. According to this embodiment, the user's signature, which is less likely to be stolen by others because the signature reflects characteristics of the handwriting of the user, is employed as the identification data, thus allowing reliable collation between the entered and reference data.

According to this embodiment, the input/display unit 32 including the plane coordinate input panel 32A and the display 32B is employed. Therefore, as a variation of the third embodiment, the display 32B may be modified to display numbers and letters at a time of requesting input of the identification data so that a password can be entered as the identification data through the numbers and letters. Further, as another variation of the third embodiment, the input/display unit 32 can be replaced by an input unit which is formed only of the plane coordinate input panel 32A only for inputting a signature without the display 32B.

A description will now be given, with reference to FIGS. 7 through 9, of a fourth embodiment of the present invention. According to each of the above-described embodiments, each of the cryptographic cards 1 through 3 performs the lock operation to set the lock thereon to prevent encryption/decryption from being performed and the lock release operation to release the lock, while according to the fourth embodiment, the lock and lock release operations are performed cooperatively by a cryptographic card 4 and a computer 300, to which the cryptographic card 4 is connected.

Figure 7:
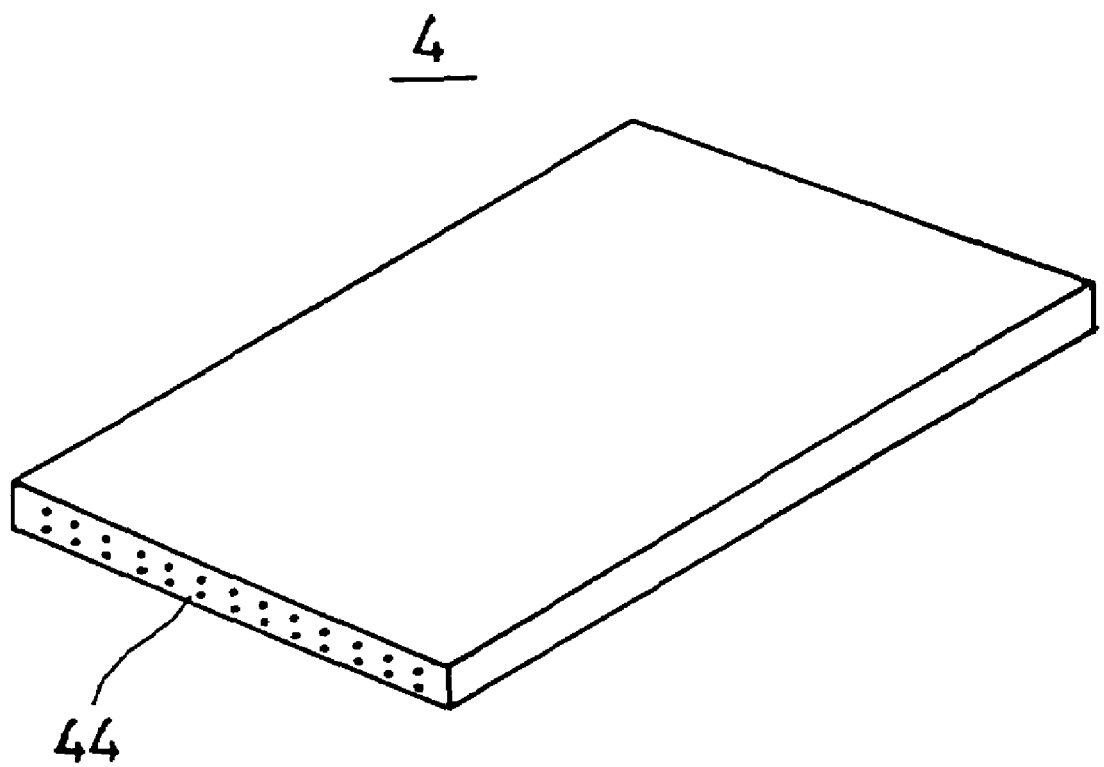
FIG. 7 is a perspective view of a cryptographic card according to a fourth embodiment of the present invention.

FIG. 7 is a perspective view of the cryptographic card 4 according to the fourth embodiment of the present invention. The cryptographic card 4 has a simple structure in which only a connector portion 44 is provided on the outside of the cryptographic card 4. The cryptographic card 4 does not have an input unit or a display unit provided on the outside thereof. According to this embodiment, input of identification data, which is performed in the above-described embodiments to register reference data for identification and to release the lock on each of the cryptographic cards 1 through 3, is performed on the side of the computer 300.

Figure 8:
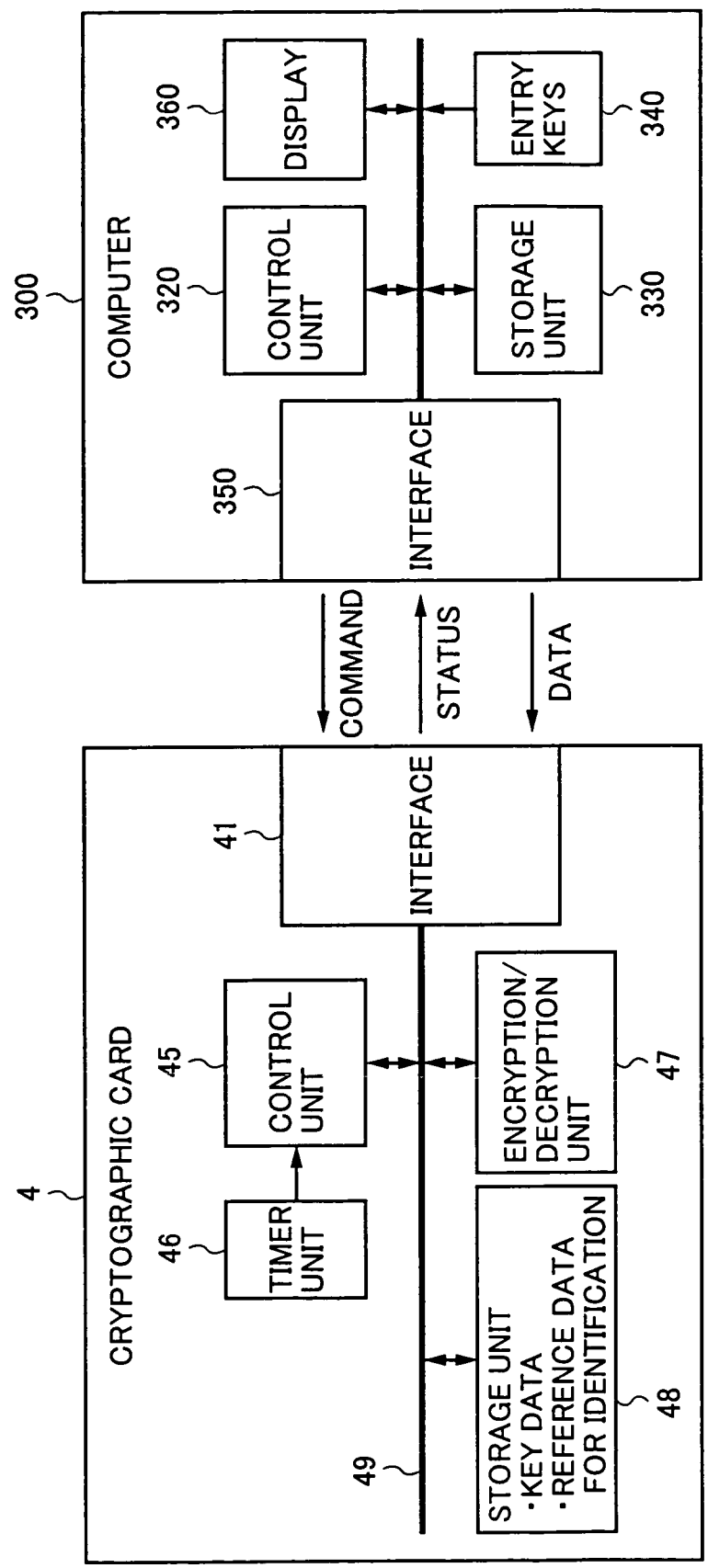
FIG. 8 is a block diagram showing a structure of the cryptographic card of FIG. 7 and a partial structure of a computer to which the cryptographic card of FIG. 4 is connected.

FIG. 8 is a block diagram showing a structure of the cryptographic card 4 and a partial structure of the computer 300, to which the cryptographic card 4 is connected. The cryptographic card 4 includes a control unit 45, a timer unit 46, an encryption/decryption unit 47, and a storage unit 48, which are connected to one another via a bus 49 so that the control unit 45 can control the whole cryptographic card 4 including a lock release operation.

The cryptographic card 4 further includes an interface 41 for connection to the computer 300. The computer 300, of which the partial structure is shown in FIG. 8, has the same appearance as the computer 100 and includes a control unit 320, a storage unit 330 including a hard disk for storing data files, entry keys 340, a display 360, and an interface 350 for connection to the cryptographic card 4. Via the interface 41 on the side of the cryptographic card 4 and the interface 350 on the side of the computer 300, a command signal is transmitted from the computer 300 to the cryptographic card 4, a status signal is transmitted from the cryptographic card 4 to the computer 300, and data is exchanged between the computer 300 and the cryptographic card 4.

The cryptographic card 4 is also originally equipped with a data conversion function to encrypt data generated in the computer 300 to prevent data leakage. The control unit 45, timer unit 46, encryption/decryption unit 47, and storage unit 48 of the cryptographic card 4 have the same functions as the control unit 15, timer unit 16, encryption/decryption unit 17, and storage unit 18 of the cryptographic card 1, respectively.

However, this embodiment differs from the first embodiment in that the identification data is input on the side of the computer 300 and the input data is transmitted to the cryptographic card 4 to be used. A variety of data such as password data to be entered from entry keys, fingerprint data to be input to a fingerprint input unit, audio data to be input to a speech input unit, or facial image data to be input to an image input unit can be employed as the identification data as far as the data can be handled by an input unit provided on the side of the computer 300. In this embodiment, a password which can be entered from the entry keys 340 provided on the computer 300 is employed as the identification data.

Also according to the cryptographic card 4, the encryption/decryption unit 47 is locked in a disabled state after the passage of a predetermined waiting time. According to this embodiment, the control unit 45 reads and compares a first waiting time determined by a user and time information from the timer unit 46. When the control unit 45 determines that a counted time exceeds the first waiting time, the control unit 45 enters a lock preparation state. The control unit 45 further reads and compares a second waiting time and time information from the timer unit 46. When the control unit 45 determines that a counted time exceeds the second waiting time, the control unit 45 locks the cryptographic card 4 in a disabled state. This process will be described later with reference to a flowchart shown in FIG. 9.

According to the cryptographic card 4, the waiting time is set and changed through the entry keys 340 of the computer 300, and when the cryptographic card 4 is in a locked state, the display 360 of the computer 300 may display "LOCK" so that it can be confirmed whether data stored in the computer 300 is in a readable state.

The cryptographic card 4 has a lock release system which is different from that of each of the above-described cryptographic cards 1 through 3. The password, which is the identification data, is entered from the entry keys 340 of the computer 300, while the reference data (password) for identification is stored and the collation of the entered password with the reference password at a time of releasing the lock is made in the cryptographic card 4. That is, according to this embodiment, in the initial use of the computer 300, the user enters the password from the entry keys 340 so that the entered password is transmitted to the cryptographic card 4 to be stored in the storage unit 48 as the reference data for identification. To release the lock on the cryptographic card 4, the registered password is entered by the user from the entry keys 340 of the computer 300 to be transmitted to the cryptographic card 4 so that the control unit 45 collates the entered data (password) with the reference data for identification read out from the storage unit 48. After the control unit 45 confirms that the entered data is identical to the reference data, the lock on the cryptographic card 4 is released.

Figure 9:
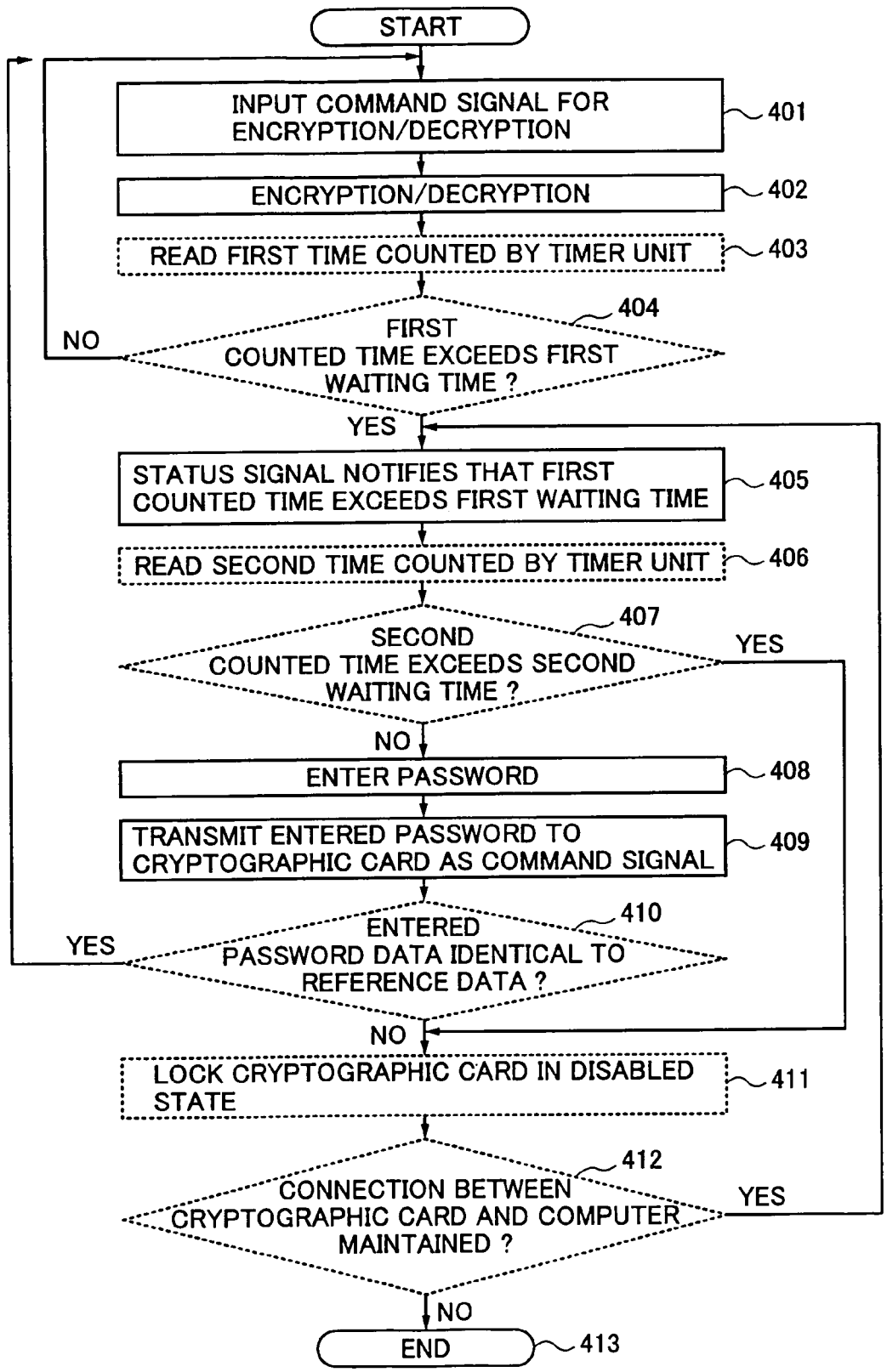
FIG. 9 is a flowchart of a process of a basic routine performed cooperatively by a control unit of the cryptographic card and the computer of FIG. 8.

FIG. 9 is a flowchart of a process of a basic routine performed cooperatively by the control unit 45 of the cryptographic card 4 and the computer 300. In FIG. 9, steps indicated by dotted lines are performed by the cryptographic card 4. The routine shown in FIG. 9 is performed by properly connecting the cryptographic card 4 to the computer 300.

In step S401, a command signal for encryption/decryption is input from the computer 300 to the cryptographic card 4. Then, in step S402, the data stored in the storage unit 330 of the computer 300 is decrypted in the cryptographic card 4 before being read out, or the data generated in the computer 300 is encrypted in the cryptographic card 4 before being stored again in the storage unit 330 of the computer 300.

In step S403, the control unit 45 of the cryptographic card 4 reads a first time counted by the timer unit 46, and in step S404, the control unit 45 determines whether the first time counted by the timer unit 46 exceeds the first waiting time. If the first counted time exceeds the first waiting time, the control unit 45 enters a lock preparation state.

If it is determined in above-described step S404 that the first counted time does not exceed the first waiting time, the process returns to step S401 and the above-described steps are repeated. On the other hand, if the first counted time exceeds the first waiting time, in step S405, a status signal is transmitted from the cryptographic card 4 to the computer 300.

In step S406, the control unit 45 of the cryptographic card 4 reads a second time counted by the timer unit 46, and in step S407, the control unit 45 determines whether the second time counted by the timer unit 46 exceeds the second waiting time. The second waiting time is used for entering the password. If the control unit 45 determines in step S407 that the second counted time exceeds the second waiting time, the process immediately goes to step S411 so that the cryptographic card 4 is disabled in a locked state. If the control unit 45 determines in step S407 that the second counted time does not exceed the second waiting time, in step S48, the password is entered. In step S409, the password entered from the entry keys 340 of the computer 300 is transmitted to the cryptographic card 4 as a command signal.

In step S410, the control unit 45 collates the entered password data with the reference data (password) to determine whether the entered data is identical to the reference data. If it is determined that the entered data is identical to the reference data, the cryptographic card 4 is kept in an enabled state and the process returns to step S401.

On the other hand, if it is determined that the password data entered in step S410 is not identical to the reference data, the process goes to step S411, in which the cryptographic card 4 is disabled in a locked state.

In step S412, it is determined whether the connection between the cryptographic card 4 and the computer 300 is maintained. If it is determined that the connection is maintained, the process returns to step S405 to repeat the steps thereafter. If it is determined that the connection between the cryptographic card 1 and the computer 100 is interrupted, the process goes to step S413 and the control unit 45 and the computer 300 terminate the above-described routine.

According to this embodiment, a password is employed as the identification data, and the input unit of the computer 300 is used to simplify the entry of the password. Further, the registration and collation of the identification data are performed by the cryptographic card 4. Therefore, the cryptographic card 4 can be produced in a simple structure without modifying the conventional circuit structure of the computer 300.

Each of the above-described cryptographic cards 1 through 4 employs the interface based on PCMCIA. However, another interface such as a USB (universal serial bus) interface may also be employed. Further, in each of the above-described cryptographic cards 1 through 4, the encryption/decryption function serving as a data conversion function is locked in a disabled state. However, it is also allowable to disable other functions if the function of each of the cryptographic cards 1 through 4 is substantially disabled thereby.

Further, the waiting time before the data conversion function enters a disabled state can be set by entering a specific time, for example, ten o'clock, so that the data conversion function becomes disabled at the specific time of ten o'clock.

The present invention is not limited to the specifically disclosed embodiments, and variations and modifications may be made without departing from the scope of the present invention.

The present invention is based on Japanese priority application No. 2000-057711 filed on Mar. 2, 2000, the entire contents of which are hereby incorporated by reference.

What is claimed is:

1. A data converter comprising:
   a data conversion unit configured to encrypt data originating in an external device and return the encrypted originated data back to the same external device to be stored therein, and when decrypting the stored encrypted originated data, the stored encrypted originated data is transmitted from the same external device to the data conversion unit to be decrypted and then the decrypted data is returned back to the same external device to be read;
   a lock system configured to lock a data conversion function of said data conversion unit in a disabled state after a passage of a predetermined period of time so as to prevent said data conversion unit from encrypting and decrypting the data;
   a lock release system configured to release the lock on the data conversion function set by said lock system so that the data conversion function is set in an enabled state; and
   a time setting unit that enables a user of the data converter to change the period of time for the lock system in accordance with the user's operation environment,
   wherein the data converter includes a connector part configured to directly connect to and disconnect from a slot part of the external device, the data converter insertably connecting to and disconnecting from the external device so as to allow data exchange between the data converter and the external device.

2. The data converter as claimed in claim 1, wherein said lock release system comprises:
   a data input unit through which identification data is input;
   a recording unit configured to record reference data for identification used to release the lock on the data conversion function; and
   a control unit configured to collate the identification data input from said data input unit with the reference data for identification, and release the lock on the data conversion function when the identification data is identical to the reference data for identification.

3. The data converter as claimed in claim 2, wherein said data input unit is formed of entry keys by which numbers, letters, and signs are entered.

4. The data converter as claimed in claim 2, wherein said data input unit is a plane coordinate input unit which is touched to allow input of data using coordinates of touched positions.

5. The data converter as claimed in claim 2, wherein said data input unit is an input/display unit comprising:
   a plane coordinate input panel which is transparent and is touched to allow input of data using coordinates of touched positions; and
   a display which is provided on a rear side of said plane coordinate input panel to display numbers, letters, and signs.

6. The data converter as claimed in claim 2, wherein said data input unit is a fingerprint input unit to which an image of a fingerprint of a user is input.

7. The data converter as claimed in claim 6, wherein:
   said fingerprint input unit comprises a fingerprint input screen to which the finger of the user is applied to input the fingerprint of the finger, the fingerprint input screen being divided into pixels to measure static electricity of each of the pixels so that the image of the fingerprint is input.

8. The data converter as claimed in claim 6, wherein said fingerprint input unit comprises a fingerprint input screen to which the finger of the user is applied to input the fingerprint of the finger, and optically acquires the image of the fingerprint of the finger applied to the fingerprint input screen so that the image of the fingerprint is input.

9. The data converter as claimed in claim 1, wherein said lock release system comprises:
   a recording unit configured to record reference data for identification used to release the lock on the data conversion function; and
   a control unit configured to collate identification data which is input to and transmitted from the external device connected to the data converter with the reference data for identification, and release the lock on the data conversion function when the identification data is identical to the reference data for identification.

10. The data converter as claimed in claim 9, wherein the external device includes an input unit through which the reference data for identification and the identification data are input.

11. The data converter as claimed in claim 1, further comprising a time setting unit configured to allow a user to set the predetermined time period before the data conversion function is disabled.

12. The data converter as claimed in claim 1, further comprising a display unit configured to display whether said lock system is in operation.

13. The data converter as claimed in claim 1, further comprising a display unit configured to display whether said lock system is in operation.

14. The data converter as claimed in claim 1, further comprising:
- a timer unit configured to count the predetermined period of time, wherein the predetermined period of time is time counted from one of a connection of the data converter to the external device and a beginning of a process performed on the external device.

15. The data converter of claim 1, wherein after the predetermined period of time passes, the lock release system requests that the user enter security information, and if security information is not entered for a second predetermined period of time, the lock system locks the data conversion function of the data conversion unit in a disabled state.

16. An electronic device for processing information, the electronic device comprising:
- a computing part configured to generate and process data;
- a storage part configured to store the data; and
- a data converter comprising
- a data conversion unit configured to encrypt the data originating in the computing part and return the encrypted originated data back to the same computing part so that the encrypted originated data is stored in the storage part, and when decrypting the stored encrypted originated data, the stored encrypted originated data is transmitted from the computing part to the data conversion unit to be decrypted and the decrypted data is then returned back to the same computing part so that the decrypted data is processable in the same computing part when receiving the encrypted data read from the storage part;
- a lock system configured to lock a data conversion function of said data conversion unit in a disabled state after passage of a predetermined period of time so as to prevent said data conversion unit from encrypting and decrypting the data;
- a lock release system configured to release the lock on the data conversion function set by said lock system so that the data conversion function is set in an enabled state; and
- a time setting unit that enables a user of the data converter to change the period of time for the lock system in accordance with the user's operation environment,
- wherein the data converter includes a connector part configured to directly connect to and disconnect from a slot part of the electronic device, the data converter insertably connecting to and disconnecting from the electronic device so as to allow data exchange between the data converter and the computing part.

* * * * *

UNITED STATES PATENT AND TRADEMARK OFFICE
CERTIFICATE OF CORRECTION

| | | |
|---|---|---|
| PATENT NO. | : 7,324,667 B2 | Page 1 of 1 |
| APPLICATION NO. | : 09/771691 | |
| DATED | : January 29, 2008 | |
| INVENTOR(S) | : Nobuo Yatsu et al. | |

It is certified that error appears in the above-identified patent and that said Letters Patent is hereby corrected as shown below:

On the title page, item [56];

Column 2 (U.S. Patent Documents), Line 4, change "O'Conner" to --O'Connor--.

Signed and Sealed this

Tenth Day of March, 2009

JOHN DOLL
*Acting Director of the United States Patent and Trademark Office*